US010814214B1

(12) United States Patent
Lahti et al.

(10) Patent No.: US 10,814,214 B1
(45) Date of Patent: Oct. 27, 2020

(54) SYSTEMS AND METHODS TO PLAY A COGNITIVE SKILLS GAME

(71) Applicant: IKONA, INC.

(72) Inventors: Katariina Lahti, Westwood, MA (US); Gabriel Levis-Lahti, Westwood, MA (US); Jonah Levis, Westwood, MA (US); Noah Levis, Westwood, MA (US); Ilias Levis, Westwood, MA (US)

(73) Assignee: IKONA, INC., Westwood, MA (US)

( * ) Notice: Subject to any disclaimer, the term of this patent is extended or adjusted under 35 U.S.C. 154(b) by 240 days.

(21) Appl. No.: 15/935,017

(22) Filed: Mar. 25, 2018

Related U.S. Application Data

(60) Provisional application No. 62/477,256, filed on Mar. 27, 2017.

(51) Int. Cl.
| | | |
|---|---|---|
| G09B 19/22 | (2006.01) | |
| A63F 3/04 | (2006.01) | |
| A63F 3/00 | (2006.01) | |
| A63F 13/822 | (2014.01) | |
| G06N 5/02 | (2006.01) | |

(52) U.S. Cl.
CPC ........ *A63F 3/0478* (2013.01); *A63F 3/00006* (2013.01); *A63F 3/00643* (2013.01); *A63F 3/00895* (2013.01); *A63F 13/822* (2014.09); *G09B 19/22* (2013.01); *A63F 2003/00996* (2013.01); *A63F 2003/0489* (2013.01); *G06N 5/02* (2013.01)

(58) Field of Classification Search
USPC ....... 434/128, 129, 236, 335, 337, 340, 341, 434/363, 404, 405; 273/236, 242, 243
See application file for complete search history.

(56) References Cited

U.S. PATENT DOCUMENTS

| | | | | |
|---|---|---|---|---|
| 2,952,924 A | * | 9/1960 | Tierney | G09B 1/22 434/404 |
| 3,263,999 A | * | 8/1966 | McCoy | A63F 1/02 273/293 |
| 3,600,846 A | * | 8/1971 | Peters | A63F 3/08 446/236 |
| 3,815,919 A | | 6/1974 | Cain et al. | |
| 3,949,489 A | * | 4/1976 | Gallucci | G09B 7/063 434/338 |
| 4,227,318 A | * | 10/1980 | Mims | A63F 3/0625 434/337 |
| 4,541,806 A | * | 9/1985 | Zimmerman | G09B 7/063 434/258 |

(Continued)

*Primary Examiner* — Kurt Fernstrom
(74) *Attorney, Agent, or Firm* — John Brooks Law LLC; John J. Brooks, III

(57) ABSTRACT

A cognitive skills game system is provided to teach players cognitive skills. The game system comprises a randomizing device, a game board comprising a game progression, a plurality of player identifiers, a plurality of predefined challenges and a set of rules. Each of the plurality of predefined challenges corresponds to a plurality of predefined expected responses. Each of the plurality of predefined expected responses corresponds to a response reward. The set of rules defining the rules to map an actual response of a player to the plurality of predefined expected responses and the response reward. The response reward defining a player progression of the player identifier along the game progression and the set of rules also defining a game winning condition.

19 Claims, 10 Drawing Sheets

(56) References Cited

U.S. PATENT DOCUMENTS

| | | | |
|---|---|---|---|
| 4,664,634 A * | 5/1987 | Cutler | G09B 5/062 |
| | | | 200/512 |
| 4,682,956 A | 7/1987 | Krane | |
| 5,020,804 A | 6/1991 | Weedman | |
| 5,161,977 A * | 11/1992 | Thomas, Jr. | G09B 3/04 |
| | | | 434/322 |
| 5,163,844 A * | 11/1992 | Hollis, Jr. | G09B 7/063 |
| | | | 434/327 |
| 5,544,891 A * | 8/1996 | Gibson | A63F 3/0478 |
| | | | 273/244 |
| 5,752,700 A * | 5/1998 | Delzotti | A63F 3/00138 |
| | | | 273/243 |
| 5,897,115 A * | 4/1999 | Sherry | A63F 3/00006 |
| | | | 273/242 |
| 5,931,469 A * | 8/1999 | Stichnoth | A63F 3/00006 |
| | | | 273/242 |
| 6,098,325 A * | 8/2000 | Goldman | G09F 11/23 |
| | | | 281/15.1 |
| 6,120,028 A * | 9/2000 | Boyer | A63F 3/00 |
| | | | 273/243 |
| 6,561,811 B2 | 5/2003 | Rapoze et al. | |
| 6,715,762 B2 | 4/2004 | Simmons | |
| 6,938,899 B2 | 9/2005 | Kenney et al. | |
| 7,073,792 B2 | 7/2006 | Exposito | |
| 7,234,699 B2 * | 6/2007 | Putnam | A63F 3/00072 |
| | | | 273/242 |
| 7,967,670 B2 | 6/2011 | Burbidge | |
| 8,303,388 B1 | 11/2012 | Bleau | |
| 8,502,789 B2 * | 8/2013 | Tse | G06F 3/0425 |
| | | | 345/173 |
| 8,876,113 B2 | 11/2014 | Dolk | |
| 8,925,923 B2 * | 1/2015 | Kanter | G09B 19/0092 |
| | | | 273/242 |
| 2003/0001015 A1 * | 1/2003 | Rouverol | G07C 13/00 |
| | | | 235/458 |
| 2003/0222399 A1 | 12/2003 | Orr | |
| 2008/0197570 A1 * | 8/2008 | Lewis | A63F 1/00 |
| | | | 273/292 |
| 2009/0004557 A1 | 2/2009 | Teal | |
| 2009/0311653 A1 * | 12/2009 | Kim | G09B 3/02 |
| | | | 434/128 |
| 2010/0068681 A1 * | 3/2010 | Rekort | A63F 3/00 |
| | | | 434/129 |
| 2010/0221686 A1 * | 9/2010 | Johnson | A63F 3/00006 |
| | | | 434/129 |
| 2014/0367914 A1 | 12/2014 | Young | |
| 2016/0232815 A1 | 8/2016 | Chchrum | |
| 2016/0271498 A1 | 9/2016 | Lifton et al. | |

\* cited by examiner

CARE TO BE KIND!

160

160A

HELP CHALLENGE: Your friend needs some help. Roll the Dice second time. You and the last person will both advance the number of steps you rolled.

160B

KINDNESS CHALLENGE : Someone is having a bad day and mood around is not cheerful. You are not sure who it is so you must say a kind word to each of your friends playing. You will each advance 1 step.

160C

FRIEND CHALLENGE : Treat your friends to a special surprise. Invite them to roll a dice with you a second time. If they roll more than you will each advance 2 steps. If they roll same number as you, everyone advances one step. If they roll less than you will each get a pat in back for giving it a try and stay where you are.

160D

BULLY CHALLENGE : Stop. There is a Bully around. Ask your friends to help. Each of you will roll the dice. If any of you will get higher number than Bully, you will each get to advance 3 steps. If any of you get the same number with the Bully, your friends will advance 1 step each to make sure Bully has gone away. If you all get less than the bully, you thank your friends for the helping to beat the bully and stay put one round catching your breath. Your friends go on as usual.

FIG. 1B

SYSTEMS AND METHODS TO PLAY A COGNITIVE SKILLS GAME

CROSS-REFERENCE TO RELATED APPLICATIONS

This application claims benefit of U.S. Pat. App. No. 62/477,256, filed Mar. 27, 2017, the entire contents of which are hereby incorporated by reference.

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates to teaching cognitive skills to players of a game. In particular, this invention relates to a decision making game system with game elements and a game progression to help teach decision making, antibullying, teamwork or social skills to game players through player's responses to situations presented to them in the game system.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

In one example embodiment, a cognitive skills game system is provided to teach players cognitive skills such as but not limited to decision making, antibullying, teamwork or social skills. The game system comprises a randomizing device, a game board comprising a game progression, a plurality of player identifiers, a plurality of predefined challenges and a set of rules. Each of the plurality of predefined challenges corresponds to a plurality of predefined expected responses. Each of the plurality of predefined expected responses corresponds to a response reward. The set of rules defining the rules to map an actual response of a player to the plurality of predefined expected responses and the response reward. The response reward defining a progress of the player identifier along the game progression and the set of rules also defining a game winning condition.

In one example embodiment, a cognitive skills game system is provided to teach cognitive skills. The game system comprises a game board comprising a game progression, a plurality of player identifiers, a plurality of challenge indicia defining a plurality of predefined challenges, the plurality of challenge indicia comprise a plurality of predefined challenges presented on a plurality of challenge cards, the plurality of predefined challenges comprising at least one conflict challenge and at least one caring challenge, a predefined response reward associated with an actual response of a player to each of the plurality of predefined challenges, a randomizing device, a player progression along the game progression represented by a progression of their player identifier as determined by one of the predefined response reward or the player or the randomizing device, a set of rules defining a game winning condition.

In some embodiments of the cognitive skills game, the plurality of predefined challenges comprises a conflict challenge and a caring challenge, the conflict challenge comprising a bully challenge and the caring challenge comprising at least one selected from the group consisting of: a kindness challenge, a help challenge and a friend challenge.

In some embodiments of the cognitive skills game, the plurality of predefined challenges corresponding to a plurality of predefined expected responses comprises one selected from the group consisting of: a predefined action response, and a predefined answer response.

In some embodiments, the cognitive skill game system further comprises a computer based game system wherein at least one of the randomizing device, the game board, the game progression, the plurality of player identifiers and the plurality of challenge indicia are presented to a player by a user interface, such as a graphic user interface, of the computer based game system.

In some embodiments, the cognitive skills game system further comprises a vote box configured comprising a first vote light and second vote light configured to identify the actual response of the player, a vote card pair comprising a first vote card from the player and a second vote card from another player whereby one of the vote card pair is configured to pass a light from the first vote light or the second vote light to indicate a vote and whereby the vote is the actual response of the player to at least one of the predefined challenges.

In one example embodiment, a method to play a cognitive skills game is provided, the method comprising providing a game system to the player; the game system comprising: a randomizing device, a game progression, a player identifier, a plurality of predefined challenges defined by a challenge indicia, each of the plurality of predefined challenges corresponding to a plurality of predefined expected responses, a response reward corresponding to each of the plurality of predefined expected responses, and a predefined game winning condition; utilizing the randomizing device to identify a progression of the player identifier along the game progression; determining whether the player is to be presented one of the predefined challenges and if so, presenting the challenge indicia to the player; receiving an actual response of the player to the challenge indicia; comparing the actual response to one of the predefined expected responses to identify a matched expected response; determining a response reward based on the matched expected response; progressing the player identifier along the game progression according to the response reward; and comparing the predefined game winning condition the game progression of the player to determine whether the game winning condition is met.

In one example embodiment, a voting apparatus is provided to determine a vote in a game system comprising a vote box and a vote card pair. The vote box comprises a base, a plurality of sides, a top, a first vote light and second vote light positioned on the base, and at least one slot in the plurality of sides. The vote card pair comprises a first vote card having a first punched hole through the first vote card and a second vote card having a second punched hole through the second vote card. The at least one slot of the vote box is configured to receive one of the first vote card or the second vote card. The location of the first punched hole on the first vote card is aligned with the first vote light when the first vote is received in the at least one slot whereby the first vote card is configured to pass a light from the first vote light to indicate a first vote and the location of the second punched hole on the second vote card is aligned with the second vote light when the second vote is received in the at least one slot whereby the second vote card is configured to pass a light from the second vote light to indicate a second vote.

These and other features are explained more fully in the embodiment illustrated below. It should be understood that in general the features of one embodiment also may be used in combination with features of another embodiment and that the embodiments are not intended to limit the scope of the invention.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1B shows an example embodiment of a challenge indicia;

DETAILED DESCRIPTION OF THE INVENTION

Figure 1A:
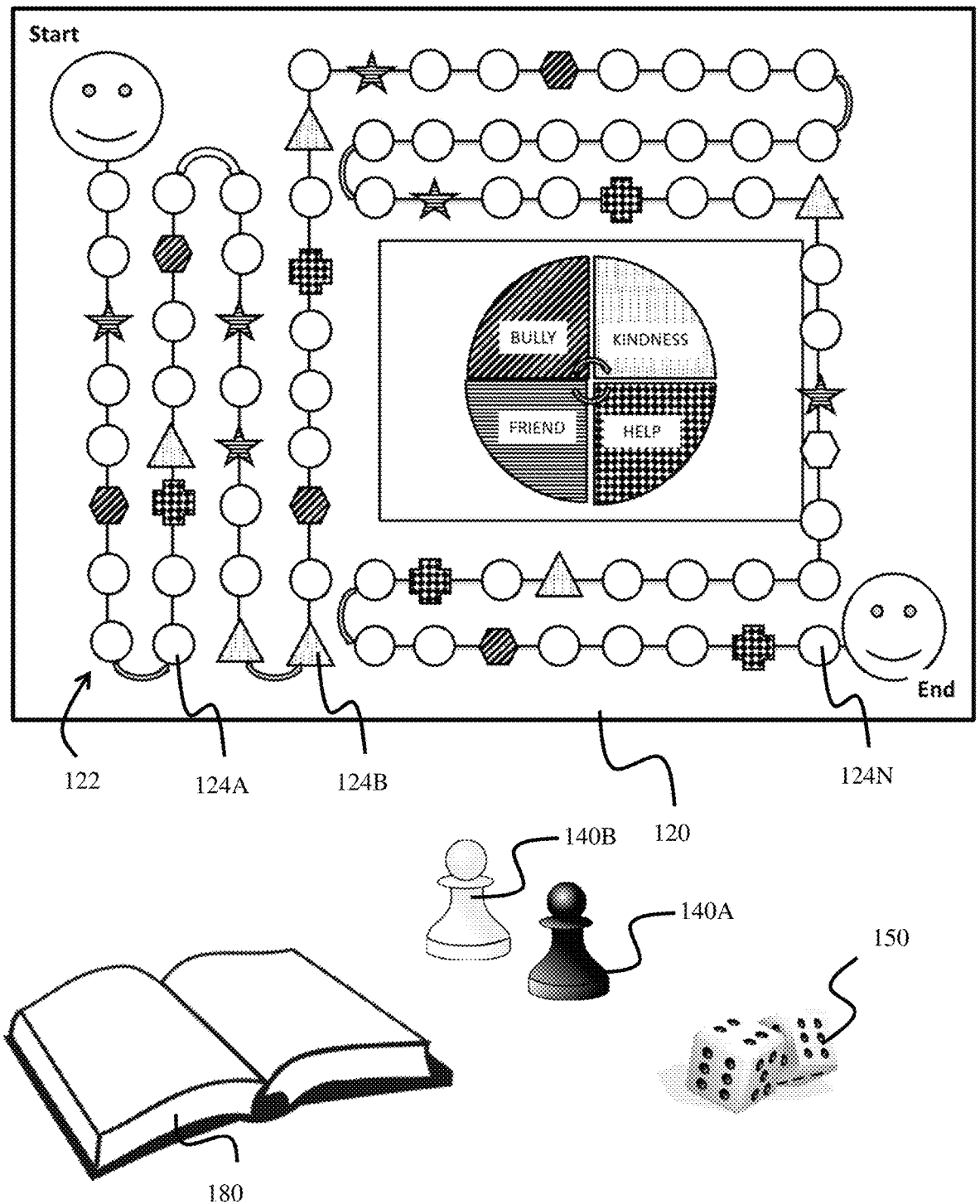
FIG. 1A shows one example embodiment of a cognitive skills game system with a game board.

Systems and methods to play a cognitive skills game will now be described in detail with reference to the accompanying drawings. It will be appreciated that, while the following description focuses on a system focused on social decision making skills for youths, the systems and methods disclosed herein have wide applicability. For example, the cognitive skills game described herein may be readily employed with the teaching of constructive social interactions, teamwork, support, kindness, caring, positive leadership, bully prevention, awareness, helping others, inclusion, friendship, online bully prevention, healthy online social interactions, online danger prevention and other forms of decision making. Notwithstanding the specific example embodiments set forth below, all such variations and modifications that would be envisioned by one of ordinary skill in the art are intended to fall within the scope of this disclosure.

In some embodiments, the game is directed to encourage and develop compassion and caring in children from toddlers to teenagers in a fun and rewarding manner without fear of being singled out but rather to be rewarded by the right actions. Repeated playing of the game reinforces and rewards making of the right choices or decisions and is intended to have this behavior becoming a norm for the game play. One intention is to build learned habits of making repeatedly right decisions so that they can translate into similar actions in real life situations. In some embodiments, the game has the game players deal with carefully selected challenges of social situations to help the player realize that proper responses to these situations can make a difference to themselves and others. The responses may include responses such as taking actions, speaking up, helping others or supporting others and the rewards that help players progress through the game align with socially acceptable responses to those challenges. The cognitive skills game system can be used by individual players, group of individuals or with teams.

One major theme in some embodiments of the cognitive skills game is to teach players how to address conflicts such as online bullying, online interactions and danger prevention. This theme may carry through all types of game settings in more or less obvious ways. For example, the challenges, responses and rewards may be structured to promote an understanding of the motives behind player responses such as may be helpful to help stand up against a bully.

Other goals of embodiments of the cognitive skills game may include helping to teach players that by helping other players or getting the help of other players they can all benefit. By putting this lesson in embodiments of the game, it is hoped that it will reinforce such behavior and make it a more normal and instinctive reaction of the players.

Some embodiments of the game are designed to promote positive social behaviors such as but not limited to constructive social interactions, teamwork, support, kindness, caring, positive leadership, bully prevention, awareness, helping others, inclusion, friendship, online bully prevention, healthy online social interactions, online danger prevention and other forms of cognitive skills.

Some embodiments of the systems and methods to play the cognitive skills game will have multiple game components that are specifically directed to various age groups, various interests and various forms of play.

As used herein, an "indicia" means any type of indication, symbol, writing, wording, text, picture or other method of communicating a message. For example, and not for limitation, an indicia for a challenge indicia, response indicia or reward indicia may be a sentence or phrase on a card or user interface communicating the corresponding challenge, response or reward to a player of the cognitive skills game. Example Embodiments of a System for Playing a Cognitive Skills Game:

In one example embodiment, a system for playing a cognitive skills game (e.g., a decision making game system) generally comprises a plurality of player identifiers, a game board defining a game progression, a randomizing device, a plurality of indicia defining a plurality of predefined challenges, a plurality of indicia predefining expected responses, a plurality of indicia predefining response rewards and a rule set defining a predefined game winning condition. The cognitive skills game system generally allows a number of players to play the cognitive skills game by moving their player identifier according to the game progression while being faced with predefined challenges along the progression that they have to respond to and their response can help or hinder their progression in the game.

The plurality of player identifiers generally comprises any method to identify one player and their state in the game from another game player and their state in the game. For a game embodiment with a physical game board, the player identifier may be any type of player pieces that can be separately identified from another. For example, one player's identifier may be a small red piece shaped as a car and another player's identifier may be a small blue plastic piece shaped as a cat. Other examples of player identifiers include figures or tokens that may represent typical player roles or characteristics reflecting the type of game environment chosen such as: bully, follower, artsy, sporty, etc. As one player's piece moves along the game progression, that player in the game can be easily distinguished from the other player(s) in the game.

The game board generally comprises any method to identify the progression of the player identifiers within the game. For a physical embodiment of the game, the game board may be a generally flat and foldable thin surface such as cardboard, wood, plastic, a sheet or the like with one surface defining the game progression. In this embodiment, the game progression may be a game path of multiple progression steps representing places for the player identifiers to move along towards the game winning situation.

The game progression may be any method of allowing each player to progress through the game. For a physical embodiment of the game, the game progression may be a game path printed on the surface of the game board. The game path may have multiple sequential steps along the path to allow a player identifier to move along the path according to the rules of the game. Although the game progression may not have a predefined end, the game path typically defines a starting point for the players and their player identifiers.

Progression step indicia along the game progression are used to define the player's state along the progression. For a physical embodiment of the game, the progression step indicia may be sequentially placed shapes upon which a player identifier can sit to identify the specific location along the game progression for that player.

The randomizing device may be any method to define a random movement or progression of the player identifiers according to the game progression. For a physical embodiment of the game, the randomizing device may be a dice to randomly define a number of steps the player identifier should move along the game progression. Other suitable randomizing devices may include, but are not limited to spinners, cards, coins and other similar devices.

In some embodiments, there are role indicia defining one or more roles to be played by players of the game. The role indicia may be any type of identifier that makes players aware of the role that player is playing in the game. For example, the role indicia may align with the specific player indicator that will be used by that player. The indicia may identify roles to be played such as, for example only, antagonist card (bully, oppressor, aggressor, provoker), neutral, victim, leader (person trying to do the right thing), friend, authoritative figure (manager, teacher, governor, CEO, supervisor, doctor, lawyer, soccer coach, etc.), subordinate (clerk, operator, worker, administrator, student) or individual contributor.

The plurality of challenge indicia defining a plurality of predefined challenges may be any method of presenting predefined challenges to the game players. For a physical embodiment of the game, the challenge indicia may be printed challenges on a set of challenge cards or printed challenges on one or more challenge sheets.

In one embodiment of this game, the type of challenge indicia defines a conflict challenge and a caring challenge. The conflict challenge may be a description of any type of situation reflecting a situation where a player is asked to respond to a conflict. In some embodiments, the conflict challenges are predefined to reflect and describe conflict-type situations that a player may encounter in real-life that can be influenced by a range of responses to that conflict. The conflict situations may be situations such as, for example and not for limitation, a dispute, a disagreement, a quarrel, a dissention, an incompatibility, an inconsistency, a feud, a friction or a hostility. For example, the conflict challenge may be a bully challenge describing a situation where the player is confronted with a bully and they are asked how they would respond. The caring challenge may be a description of any type of situation reflecting a situation where a player is asked to respond to situation where a caring response may be appropriate. In some embodiments, the caring challenges are predefined challenges to reflect and describe situations that a player may encounter in real-life that could be influenced by a range of responses some of which may be a type of caring or compassionate response. The care or compassion responses may be responses such as, for example and not for limitation, sympathy, empathy, concern, sensitivity, warmth, love, tenderness, mercy, tolerance, kindness, help, friendship or charity. For example, the caring challenge may describe a situation where another person is sad and the player is asked how they would respond.

In some embodiments, the caring challenges may be further defined to include more specific types of caring situations. For example, the caring challenges may include kindness challenges, help challenges and friend challenges. Each of these types of challenges generally define a more specific type of caring challenge/situation. For example, the kindness challenges may be a challenge that is trying to reinforce kindness in the players and therefore the challenge presents a situation where a kind response is one of the expected responses and the kind response receives a greater reward than an unkind response. Similarly, the help challenges and the friend challenges are caring challenges that are predefined to describe situations that include and reinforce help and friendship responses from the players.

Challenges may include action challenges where an action response is requested.

The plurality of response indicia defining predefined expected responses to the predefined challenges may be any type of indicia to associate the expected responses to the player's actual response. For a physical embodiment of the game, the response indicia may be a set of choices the player may identify as their actual response to the challenge printed on the challenge card.

In some embodiments of this game, the expected response may comprise an action or open response from one or more of the game players. For example, the player may be challenged to give a hug to one of the players, say a kind word to one or all other players or to try to lead all the players to working together by having each contribute to a common goal (e.g., saying a verse from a song or making a poem, making different facial expressions (e.g., sad, happy, exited, friendly, tired etc.), doing different poses, making drawings together (e.g., one player draws a line and next player continues etc.), or creating a story together in a similar manner etc.). For a more specific example of a response being an action or open response, the challenges may be part of a game theme to promote an understanding of the motives behind a player's responses. With this theme, the challenges may be tailored to teach players about standing up against a bully while anticipating that a bully might try to manipulate the situation and divide the players so they cannot unify against them. In this theme, the challenge a player may be presented is a bully or person only interested in winning and that bully might pretend to do all the right choices and move ahead by doing so. To help promote players to properly read into and address this type of challenge, the expected response may include action responses such as: having the challenged player ask other players true or false questions, blindfolding one of the players while dividing other players into silent teams by giving them a theme and then asking the blindfolded player to find out who belongs to which team, making "good and bad" teams where a good team will need to try convince bad team members to join their cause, having a player face a hypothetical bully and having other players come into rescue by helping him/her answer the questions with the player. Help may also be provided to some players by providing questions in the challenge that each player can answer anonymously on a paper and the players can then together choose the best response and build a consensus without having it being influenced disproportionally by any particular player.

The plurality of predefined reward indicia may be any type of reward indicia that defines a game reward to the player corresponding to the one of the expected responses that matches the player's actual response. For a physical embodiment of the game, the predefined response reward indicia may be printed description that defines a forward move for an appropriate response that is consistent with the challenge and a backward move for a response that is inconsistent with the challenge. The printed description may be printed on the game board, they may be included in a rule book or they may be printed on a set of reward cards.

The predefined reward indicia are associated with the expected response indicia so that the players actual response can be mapped to the appropriate reward. The predefined expected response indicia, predefined rewards and predefined associations between these components, allows the actual response of the player to be matched to one of the expected responses. The predefined expected responses, predefined response rewards and predefined association between these components, allows the response reward to be determined based on the predefined expected response. For example, if the predefined expected response indicia is a list of expected responses (e.g., responses a-d) and a list of predefined rewards (e.g., corresponding rewards a-d) are aligned for each of these responses such that a "correct" response gets an appropriate "good" reward and an "incorrect" response gets an appropriate "penalty", when the player provides an actual response is closely aligned with one of those expected responses (e.g., response "a") the player gets an appropriate reward according to the alignment of the rewards to the response (e.g., reward "a"). Response that are more open or based on an action can also have expected response indicia align with corresponding reward indicia. For these open or action based responses, other players may help determine the alignment of the players actual response to the expected responses.

For embodiments of the game where the response comprises an answer response to a question, matching of the answer (the actual response) to the reward indicia may be done by matching the actual response of the player to the expected response indicia and the reward indicia. For example, the player may answer the challenge by identifying one of several multiple choice answers printed on a card and the reward may be a predefined move to be made for that one of the answers. For a more specific example of a response being an answer response to a question, the challenge may be asking what the player would do if they see an old lady crossing a street with several multiple choice responses such as: will you walk with her and make sure she passes street safely, keep on walking, cross your fingers that she will make it or think to yourself that she is walking good for being so old. Each of these choices are also associated with a reward indicia which is reflective of the appropriateness of that response such that if the player chooses the correct answer which in this case is obvious, she will get a reward that is appropriate for the level of question such as moving forward a few steps. If the player chooses an answer that shows they don't care what happens as it's not their concern, an appropriate penalty will be assessed such as moving back a number of steps. The in-between questions may be used to see if the player makes the funny or insensitive choice in which case an appropriate penalty will provided. A penalty may be a simple going backwards, staying stuck or making an action or a combination of all. For example, the penalty may be to go backwards unless the player makes an effort to correct one's behavior; such as a 1 minute (timer included) speech on for how reasons why the old lady might need help, or to give 5 examples of situations where people may have difficulty crossing a street (walking up the stairs) etc. Similar cases will be made towards various situation in kindness and friendship play areas with the hope that players making the non-correct answer after having to think of the situation and to emphasize with the situation before moving on will gain some understanding of people and events around them.

For embodiments of the game where the responses may comprise an action or an open response, matching of that response to the reward indicia is done by the game players. For example, if the challenge is to say something nice or doing something that make players happy, the matching of the action to the reward indicia will be determined by the other players. If a majority of other players agree the action was successful, then they all will benefit by the way predefined by the reward indicia. In some scenarios, the challenge may require the challenged player to enlist another player in dealing with the challenge. In the scenario where the helping player is not relying only on a dice to determine the response or reward for the challenge, but instead is required to perform some type of a supportive or leadership act, the completion of the such act is determined by the player facing the challenge and requesting the help. If the challenged player feels that the task as completed successfully, then they will both or all who participated in this action, be rewarded according to indicia as predefined on the cards.

Figure 7A:
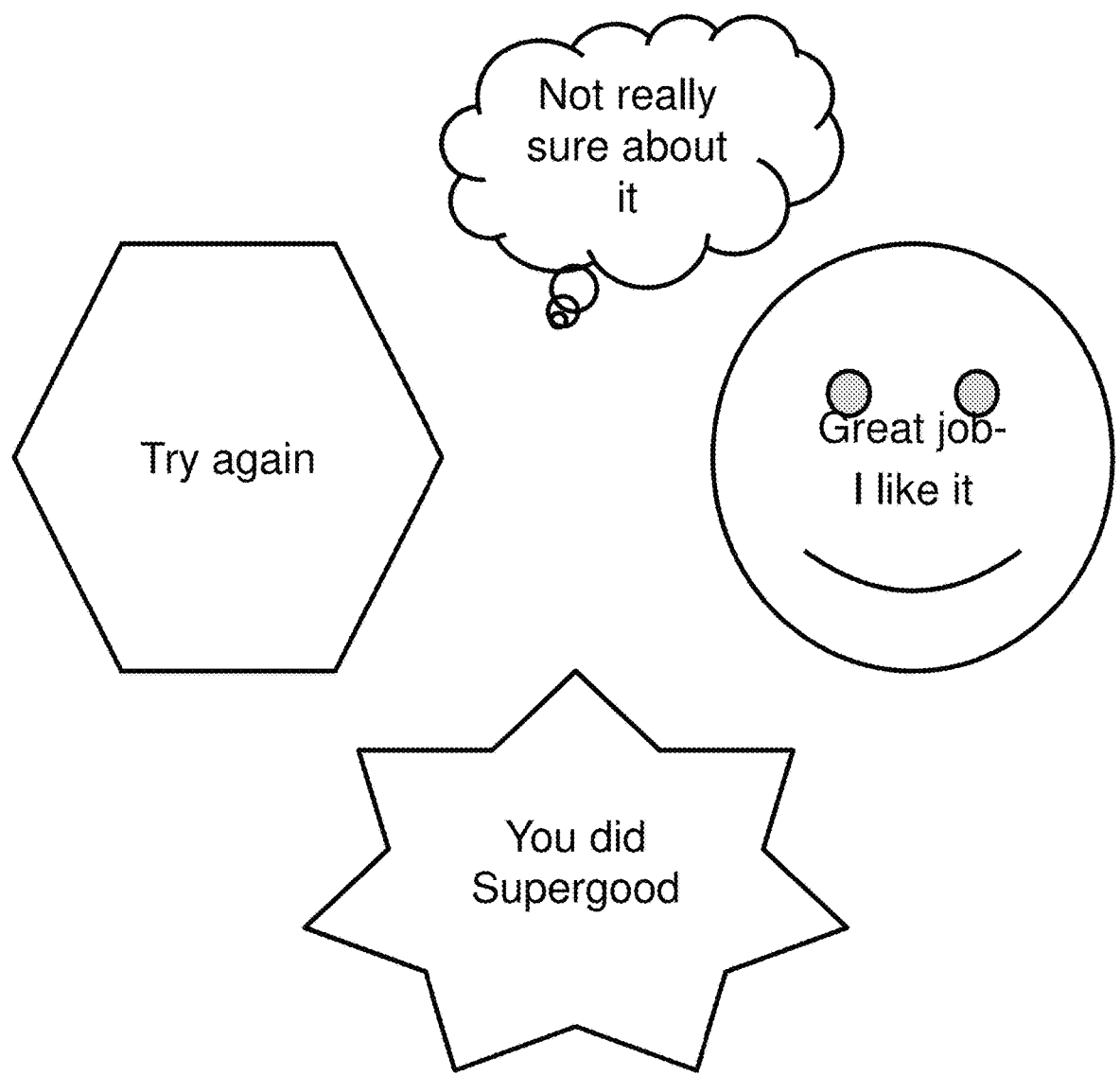
FIGS. 7A-7C illustrate various embodiment of devices to assist players vote in example embodiments of the cognitive skills game.

In some embodiments of the game, the matching of the response to the reward may be done with players input, such as by having the players vote. In some embodiments of the game, the voting may be done with one or more multi-sided cards that have one vote on one side and another vote on another side. The cards may be mounted on a stick to hold the card up/out more prominently. For example, the cards may have a "yes" on one side and a "no" on the other. Other examples of the vote cards may be "way to go" and "almost there" or "you nailed it" and "try again". Some examples of messages on vote cards are shown in FIG. 7A.

In some embodiments of the game system, elements are designed and configured to further enhance the purpose of the game. In some of these embodiments, a specifically designed voting apparatus is used which enhances the engagement of the players and encourages cooperation of players especially when the input from multiple players is used to determine game progression.

Figure 7B:
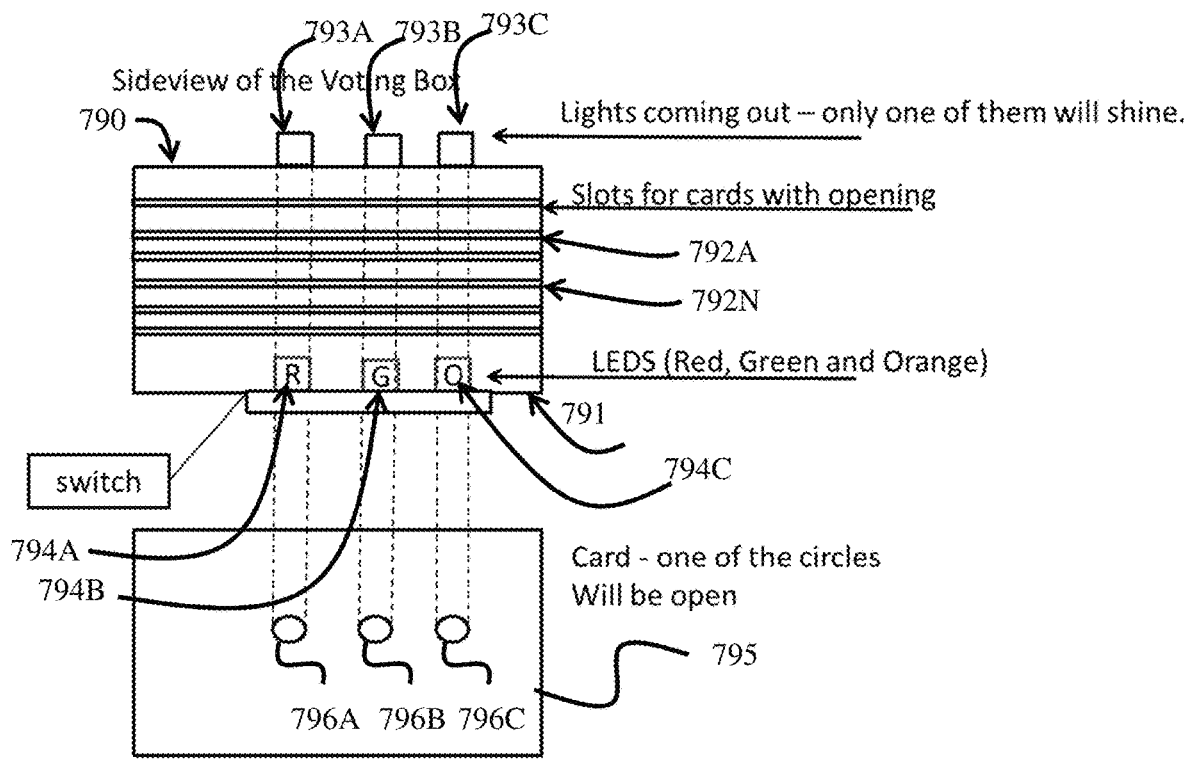

In one of embodiment having a voting apparatus, referring to the example shown in FIG. 7B, a vote box and punched voting cards may be provided as a voting apparatus. The vote box 790 may comprise an enclosed box with a base 791, card slots 792 and light emitting areas 793. The base may have a number of different colored lights 794A-794C, such as colored LEDs pre-positioned to shine inside the vote box 790. For example, the lights may be Red 794A, Orange 794C and Green 794B, each representing a different "vote" for the type of reward is deserved for the response. The card slots 792A-792N are one or more openings in the vote box 790 that allow players to slide voting cards 795 inside a card slot. The card slots 792A-792N would be small enough to limit the amount of light that would shine through the cards slots 792A-792N when the voting cards 795 are placed in them. Players would stack the voting cards 795 on top of each other's voting card 795 in the card slots 792A-792N. The punched voting cards 795 would have a pre-punched hole 796A-796C positioned on the voting card 795 so that a single one of the holes 796A-796C on each voting card 795 aligns with one of the colored light emitting areas 793A-793C when the voting card 795 is put into one of the card slots 792A-792N of the vote box 790. For example, referring to FIG. 7B, a voting card 795 representing a vote aligning with the RED light 794A would have a hole punched 796A in the voting card 795 that would allow a red light 794A to pass through to the red light emitting area 793A but would block the GREEN and ORANGE light. For the players to vote, each player would pull the voting card 795 that aligns with the color light 794A-794C that represents their vote and they would put that voting card 795 into one of the card slots 792A-792N. After each player places their punched voting card 795 in the slot, the lights 794A-794C would be turned on and the players would be able to see the results of their votes through the light emitting areas 793A-793C. The results of the vote would be seen through the color light, if any, that would be coming from the light emitting areas 793A-793C. For example, if each player voted with the same type of punched voting card, that color light would be seen coming from the box. If there was a difference in punched voting cards, no light would be coming from the voting box and players would know there was no agreement on the vote. Using the example shown in FIG. 7B, assume the color GREEN (G) represents a "Yes" vote, RED (R) represents a "No" vote and ORANGE (O) represents another type of vote such as "Maybe" or "No Opinion". With this configuration, if all players agreed to vote "Yes" and they put in the punched vote card representing that vote, the color coming out of the box would be GREEN and the vote of the players would be "Yes". If even one player disagreed with the "Yes" vote and put in a different punched vote card, no color will come through. If all the players wanted to vote "No" and inserted that punch vote card, the color coming out would be RED. If none of the players have an opinion and voted that way, the color coming out of the box would be ORANGE. During game play, if an ORANGE light were to show reflecting "Maybe" or "No Opinion", the players may need to revote using the vote box or some other voting mechanism or face a "penalty" for not responding which is an important part of participating.

Figure 7C:
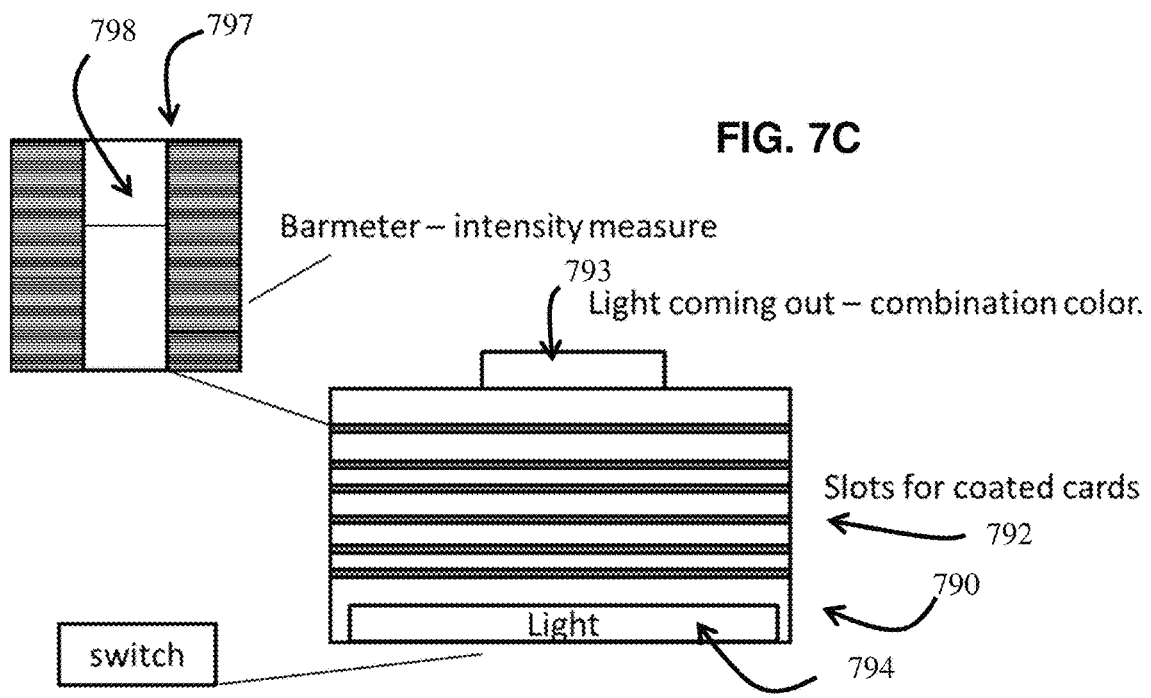

In another embodiment of capturing player's votes, votes may be captured with a vote box and transparent cards. In this embodiment, as shown in FIG. 7C, a vote box 790 may be provided with a base having a uniform illumination from a light 794 such as a white LED. The transparent voting cards (not shown) will not have holes in them but instead will have a coating or some other property so that when they are placed in a box with white light only one predetermined color will show up. In one embodiment, the cards may have a neutral color with some indication, such as lettering (G, R, O) indicating the color they represent. Any range of colors may be used depending on how many responses there are. Similar to the embodiment with punched voting cards, after the players insert their transparent vote cards into the card slots 792, the light 794 will be turned on and the vote of the players will be reflected by the color of the light coming out of the vote box in the light emitting area 793. As with the punched vote cards, consistent votes by players will give a consistent color coming out of the vote box 790 and inconsistent voting will show none or an inconsistent color.

In some embodiments, the transparent vote cards may be obviously colored and when placed on top of the light on the base of the vote box, the vote of the players can be seen by the light coming from the vote box.

In some embodiments using transparent vote cards, as shown in FIG. 7C, the vote of the players could be determined by an intensity measure, such as provided by a barmeter 797 that senses the intensity of the light coming through all of the transparent vote cards and provides an indicator of the resulting vote of the players. The barmeter 797 may sense and have an indicator 798, such as a visual bar indicator that is raised up and down or an indicator arrow that is moved up or down a scale to indicate the intensity of the light coming through the cards. For example, it may sense the color GREEN representing a "Yes" vote and the more cards inserted that represent the color GREEN, the barmeter 797 will sense that and the bar indicator or the indicator arrow may move reflecting this intensity. The indicator 798 may also have a threshold to represent a majority of a certain color of vote. In some embodiments, the indicator 798 may be a digital display indicating which color/vote is most popular. In some embodiments, the indicator 798 may provide for a visual inspection. During game play, if the barmeter 797 or indicator 798 identifies a color other than RED or GREEN, indicating votes that are not unanimous, the game may require a revote or other activity based on the expected response or reward for that challenge.

In some embodiments of the game, the ability of the players to provide responses and receive rewards may be further enhanced to include "retaking" responses and having rewards that include being "in limbo". For example, if the challenged player does not feel he/she was not supported successfully by the helping player, the helping player can either ask for a retake with an option to ask for a remediation from the other players, who could also try help the helping player make a better effort, or those other players will face a penalty that is predefined in the reward indicia. It is important to also realize that the challenged player, the person who is stuck and in need of help, may try to use the situation to undermine the player who is trying to help by not accepting their effort in performing an action. Therefore, if the helping player ends up failing the help i.e. does not perform the action required or does not seem to do it sincerely as determined by the challenged player, nor does the challenged player accept the performance upon retakes, then not only will the helping player face a penalty but the challenged person who was stuck will end up in a limbo, where they will roll a dice which will determine if they get cleared from the situation or need to stay for a period of time before they can move again. This way, the challenged player who is stuck will need to think very carefully if they are to accept or deny the helping actions of the helping player. The preset moves and penalties will be predefined in the reward indicia for that challenge.

The predefined game winning condition comprises any definition of the progression state of one or more players of the game that represents a winning condition. For example, in a physical embodiment of the game, the winning condition may be defined as one or more player identifiers have reached a finish step in the game progression.

It is understood that the game may have its components customized to be more receptive to certain age groups, certain subject matters, certain themes and certain forms of play. For example, the cognitive skills game system may have different themes with the player identifiers, game progression, challenge indicia and reward indicia reflecting that specific theme.

For illustration purposes and not for limitation, one embodiment of the present invention is shown in FIGS. 1A and 1B. As shown in FIG. 1A, this embodiment of the cognitive skills game comprises a plurality of player identifiers 140A and 140B, a game board 120 having a game progression 122, a plurality of progression step indicia 124A-124N along the game progression 122, a randomizing device 150, challenge indicia and a rule book 180 including instructions defining the game winning situation. In this embodiment, the challenge indicia refer to the challenge indicia 161A-161D on the challenge sheet 160 of FIG. 1B which also includes the expected response indicia as well as the reward indicia.

Figure 1C:
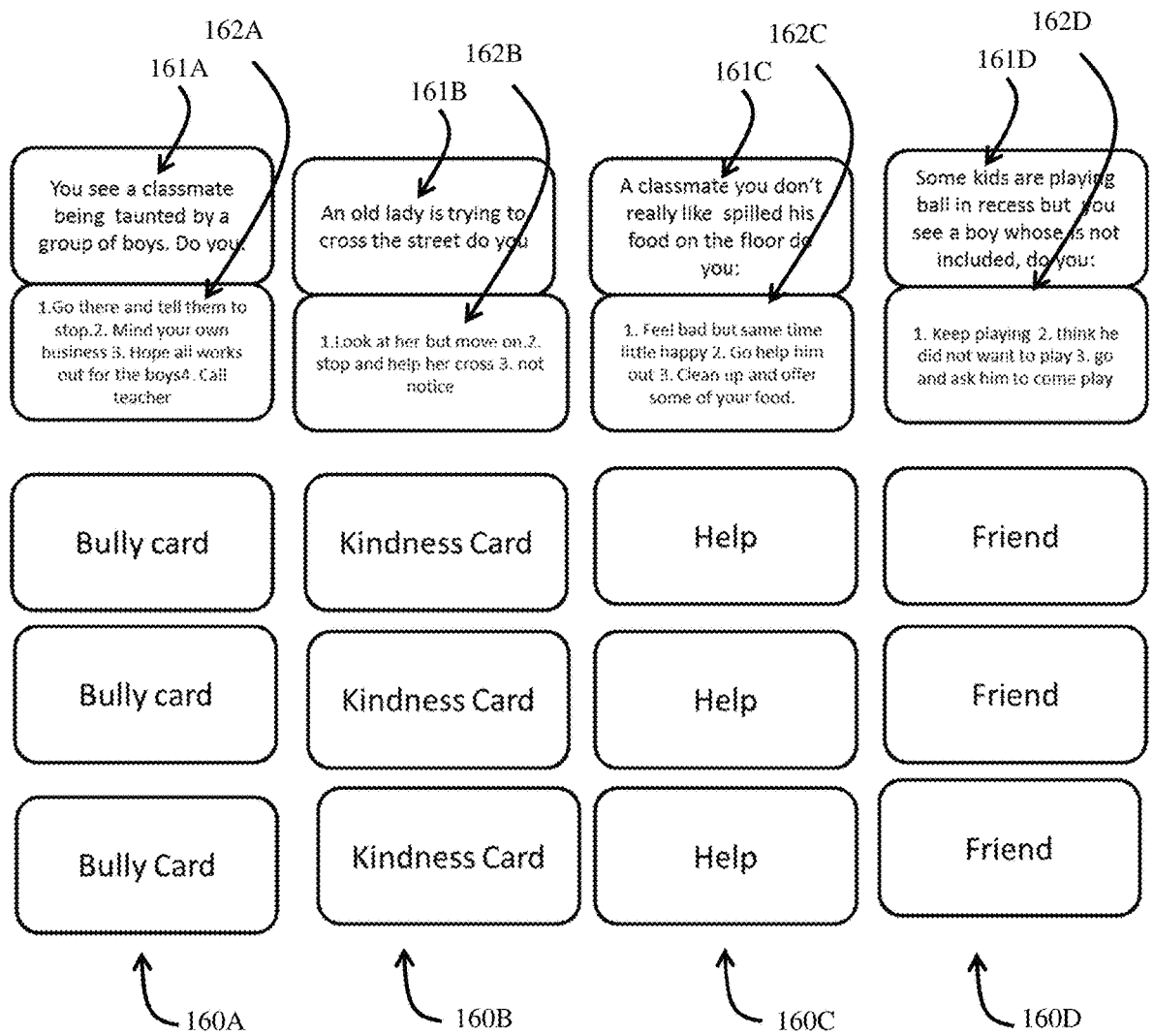
FIG. 1C shows an alternative embodiment of a challenge indicia.

In some embodiments, as shown in FIG. 1C, the challenge indicia 161A-161D may be printed on cards 160A-160D in a card deck with the challenge indicia 161A-161D and expected response indicia 162A-162D printed on one side of the card. In this embodiment, the reward indicia (not shown), to be matched to the actual response, may be included on that card, on another card, on a reward sheet or in the rule book.

As shown in FIG. 1C, the cognitive skills game may further comprise multiple decks of cards 160A-160D corresponding to different types challenge indicia. For example, challenge cards corresponding to conflict challenges may be cards of one color while caring challenge cards such as kindness challenges, help challenges or friend challenges may be cards of a different color.

Some examples of challenge indicia are listed below reflecting several action and open response cards with some funny cards included that will lighten the mood and make the game more fun to play. Some examples of funny and more serious challenges with expected responses and rewards corresponding to:

Challenge: An old lady is waiting to cross a busy street.
Expected Response Choices/Indicia:
a. You will walk her to the other side.
b. You keep on walking without noticing.
c. Think how good she looks for being so old.
d. Stay to watch what happens and keep your fingers crossed she will make it.
Reward Corresponding to Expected Response Chosen:
a. Excellent. Tell 3 good other scenarios where a person would need help crossing a road and you will get extra roll on dice.
b. You are not paying attention to your surroundings. Stay where you are one turn.
c. Nice thoughts but you need also to act. Tell all other players something nice. Please make a sincere effort as If a YES vote wins, you can continue as usual. If get NO vote, you will need to stay one turn.
d. Wishing well is good but you need to act also. Give a hug to all other players and you can continue as usual.

Challenge: Your go to an important meeting and see your Boss presenting your work as her own.
Expected Response Choices/Indicia:
a. Of course she should as she is your boss.
b. You are furious but decided there is nothing you can do but to be a team player.
c. You get upset, can't listen to it for a second and leave meeting banging the door.
d. After the meeting you will meet your Bosses Boss and tell her about the incident.
e. After the presentation, you will raise your hand, sand up, thank your Boss for presenting your work so well and add few clear points to it.
Reward Corresponding to Expected Response Chosen:
a. You need to realize your value and rights as an employee. Tell other players 3 good reasons why it's wrong for the Boss to present her employees work as her own. If you get a YES vote you can continue as usual.
b. You need to realize your value and rights as an employee. Tell other players 3 good reasons why it's wrong for the Boss to present her employees work as her own. If you get a YES vote you can continue as usual.
c. It's good to show your disappointment but you need to do it in a smart way. Convince other players with a timed 1 min speech that although you parents bought your clothes it was your idea to buy them. If you get a YES vote you can play as usual. If you get a NO vote you will need to stay and think how to rationally convince others.
d. Although it's good to hold your own, you need to be careful when doing things behind others backs and it can really backfire on you. Have a 1 min debate with other players it this was correct action on not. After debate you can move on as usual.
e. Tell other players 3 points why this is the correct answer and you can roll dice again.

Challenge: You catch a colleague you don't like picking their nose in the bathroom.
Expected Response Choices/Indicia:
a. Tell everybody—this is comedy gold.
b. Stay silent.
c. Call him/her out, but do not tell anyone else.
d. Join them.
e. Take a video and post it on Instagram.
Reward Corresponding to Expected Response Chosen:
a. You need to pick your nose if front of everyone. They should all describe how it looks. You will wait one round and think how it felt.
b. Silence is gold. You can use all extra time saved by not interfering to roll again.
c. You may be doing a favor to him by pointing out his fault and preventing future embarrassments. But it is still embarrassing. You must tell one thing you think is embarrassing and why. You can then go one as usual.

d. Nothing wrong in joining someone. Please ask all players what they think is embarrassing to them and join them is possible (i.e. If someone snorts you must snort). You can continue as usual after completing this e. This is a serious NO. You must tell an embarrassing 1 min story about you. If the story gets silent approval (i.e. voted YES without showing who votes what), you can continue after waiting for one round to think how people thought of you after the story.

Other examples of challenge indicia and expected response indicia:

Challenge: You fart in the middle of class and it smells terrible. Everybody is blaming this one kid, and they're getting made fun of.

Expected Response Choices/Indicia:
a. Tell everybody it was you.
b. Go up to them after class and tell them it was you.
c. Don't do anything.
d. Blame somebody else.
e. Join in and bully the kid.

Challenge: You're playing basketball outside when a kid asks to join. We all know that they are terrible and will not take it seriously.

Expected Response Choices/Indicia:
a. Tell them they can't play.
b. Let them play, but don't give them the ball.
c. Quit the game.
d. Tell them that there are too many people already.
e. Let them play and teach them how to play better.

Challenge: Kid you know posts an offensive meme.
Expected Response Choices/Indicia:
a. Who even cares.
b. Report it.
c. Let them know it's offensive.
d. Block them.
e. Roast them in the comments.

Challenge: Your best friend gives a dreadful response to a really easy question and it's clear they aren't feeling well. Everyone starts laughing.

Expected Response Choices/Indicia:
a. Join in—that's actually hilarious!
b. Get embarrassed—how could I be friends with such a weird kid.
c. Stand up for him—call out the teacher it's their responsibility to protect your friend.

Challenge: Your teammate is really tired during practice and cannot run anymore and as a result your coach makes your team do more laps. Your teammates call them fat and lazy and he/she gets really upset.

Expected Response Choices/Indicia:
a. Join in—he deserves it!
b. Tell your teammate to pick it up so one day he can become like you.
c. Do nothing.
d. Insult the bullies back.

Challenge: There's a new kid in school and tells awful jokes. At lunch he wants to sit with you and your friends. After nervously asking to sit with you your friend says, "A kid like you will never be able to sit with us—your table is over there" and points at an empty table. The kid starts to walk over as everyone at your table laughs.

Expected Response Choices/Indicia:
a. Join in laughing.
b. Wait until they are all gone and then tell the new kid you appreciate his jokes.
c. Go sit with him.
d. Do nothing.
e. Scold your friend and remind him of when he was a new kid.

Challenge: A kid you don't really know posts a weird picture on Instagram. He gets made fun of in the comments.
Expected Response Choices/Indicia:
a. Roast him in the comments.
b. DM all your friends secretly.
c. Post an awkward picture of yourself and start a new trend.

In some embodiments, the challenge indicia may identify an action to be performed. These action challenge indicia may be divided into two basic types of actions, an action that the player picking the challenge indicia will need to do and an action that the player picking the challenge indicia will ask someone else or many others to perform. For these action challenge indicia, the expected response and reward may be predefined similar to the manner the expected responses and rewards for the challenges above. As shown in some examples below, in some embodiments, the action challenge may predefine a special method of mapping a response to a corresponding reward.

Some examples of action challenges include, but are not limited to:
a. Hug every player in the game.
b. Tell everyone something nice.
   a. Mapping Response to Reward: Others will vote if successful. If Yes vote wins, player will continue as usual. If a No vote wins, there can be a retake. If still not successful player must move backwards but amount rolled in dice.
c. Make a story or song etc. with all other players (each will add a sentence after previous player).
d. Blindfold another player, setup teams with specific themes (one is for example a soccer team the other basketball), take blindfold away and ask the person to try identify teams and their themes with yes/no answer questions.
e. Ask another player to help you respond to a bully who is bothering you. They will need to say something that would make you feel better after a bully encounter.
   a. Mapping Response to Reward: The challenged player determines if successful. If successful, players will each get to roll a dice again. Is not they can try one repeat. If still not successful, you will both need to wait one turn.
f. Trust another player to lead you blindfolded to the closet door or table or some other location.
g. Trust other players. Write a supportive sentence (can be predetermined or made up) on a paper, then pass along a sentence from player to player and ask them not change it. See if it comes back the same. If changed, all other players need to stay one round to think about trust. If did not change everyone will move 2 steps.

In some embodiments, the cognitive skills game system may be implemented in a computer based embodiment where the game can be played as an app or as computer game. Computer-based embodiments may be configured to work on or with any processor-based device to include major smart phone, tablet and computers.

For a computer based embodiment of the game system, elements of the game may comprise game components and game data. The game components may comprise components such as a user interface to communicate with the player and modules to perform the functions similar to those provided by the board-based game. For example, the modules may comprise a randomizer module, a game progression module, a reward matcher module, a response matcher module, and one or more databases storing game data. The game data may comprise player identifier data and the predefined indicia such as challenge indicia, expected response indicia and response reward indicia reflecting the same type of information that may be used in the physical embodiments of the game described herein. Player identifier data, game progression data and the indicia may be presented to the player through a user interface such as a web browser on a computer display or a specially designed graphic user interface. The game data may also be organized according to themes or scenarios.

Some embodiments of a computer based game provide additional features such as a game mode selector module, a player mode selector module or one or more artificial intelligence modules. A computer based game system may be accessed by one or more user interfaces accessing the game system software remotely over a communications network such as the Internet.

Figure 2:
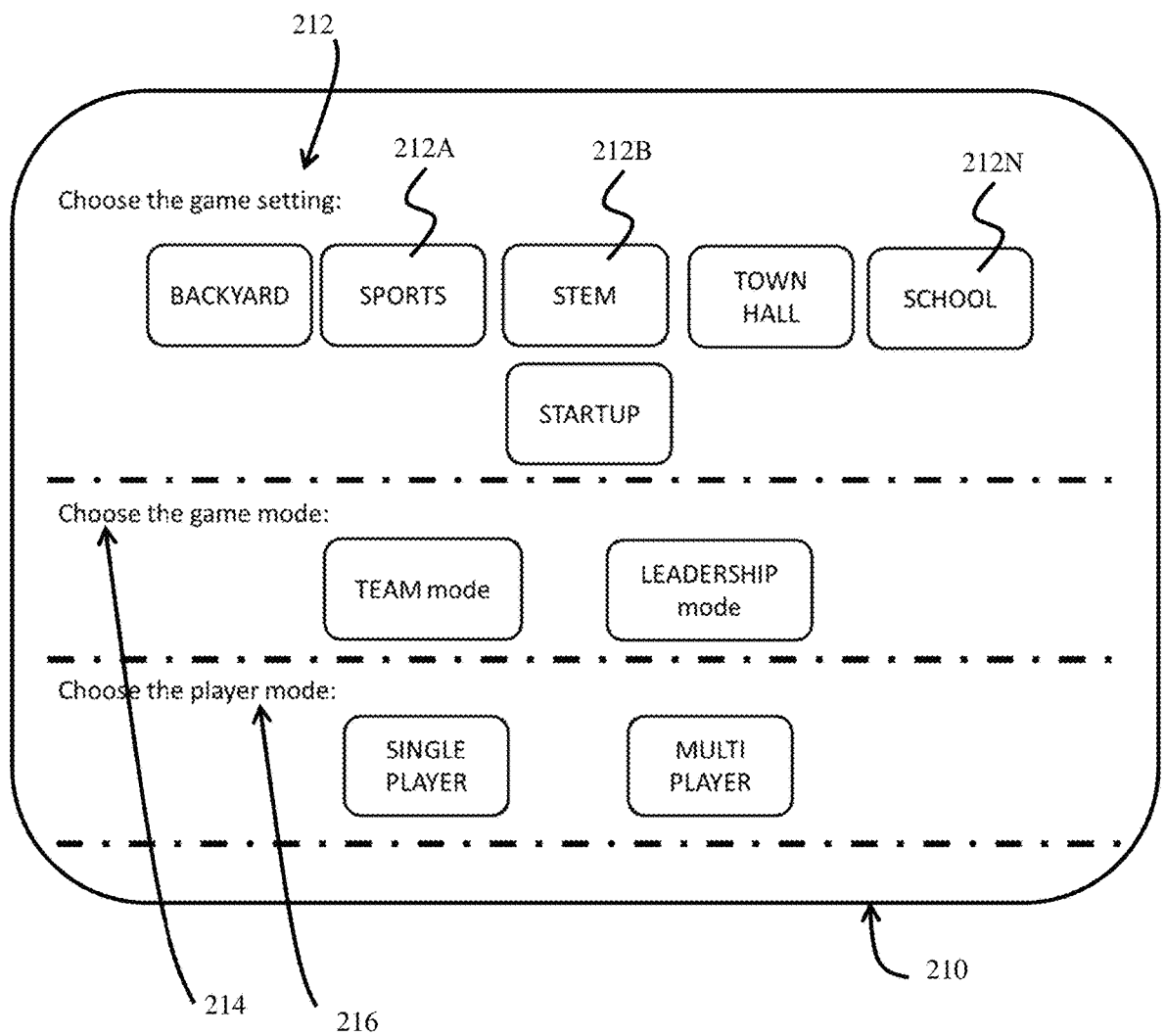
FIG. 2 shows an example embodiment of a user interface for a computer based embodiment of a cognitive skills game system.

FIG. 2 illustrates one example embodiment of a user interface 210 for a computer-based cognitive skills game system. In this embodiment, players choose which game scenario they would like to play by selecting icons 212A-212N representing one of the different game themes or settings 212. By selecting one of the game themes, the game system may automatically selects game components that are consistent with this theme. For example, the game components that could be customized would include: player identifiers, challenges, expected response and reward indicia and winning conditions consistent with the selected theme.

In some computer-based embodiments, as shown in the example of FIG. 2, the cognitive skills game system may further allow the player to select one of several player modes 216. For example, as shown, the player mode could enable a player to play individually or as one of multiple players. In some embodiments, the multiplayer setting may give the player the option to play the game online with other players. The player may also be able to invite others to join their team and ask to be part of teams. If they choose single player mode, the player will go through a game progression by solving preset problems and getting feedback. For both single and multiplayer modes there is HELP available.

In some computer-based embodiments, as shown in the example of FIG. 2, the cognitive skills game system may further allow the player to select one of a plurality of game modes 214. The game modes 214 may provide further granularity to the game setting. For example, as shown the game mode 214 could allow a player to select play in a team mode or a leadership mode. The team mode selection would notify the game system to present challenge, expected response and reward indicia consistent with team challenges. The leadership mode selection would notify the game system to present challenge, expected response and reward indicia consistent with challenges more consistent challenges faced by people in a leadership role. When a player chooses to have a leadership role in leadership mode, they may be able to invite other players online to join their team.

In some computer-based embodiments, voting of players may be determined by each player selecting a voting button or other icon on the user interface and the results are determined and shown to the player through the interface. Feedback may also be provided to players resulting from the vote. In embodiments where a player selected a leadership role through the leadership mode, game may be enhanced to have the results of certain key votes provided as a "press conference" with the voting results and other more detailed feedback consistent with the vote provided as text to one or more players. Feedback could be provided by prefilled anonymous forms the other players would selected as feedback. The prefilled forms could simply be a "Yes" or a "No" or it may include more detailed feedback reflecting details that player felt to share. Similarly, free-form text could also be included in the vote and the feedback to be provided.

It is understood that although the above features such as selecting a game theme, selecting a game mode, selecting a player mode and selecting a player role are described as being part of a computer-based cognitive skills game, these different modes may also be able to be reflected in a physical embodiments of the game. For example, the different modes may be able to be reflected in different color cards, different shaped cards or different cards with some other form of identification so that cards can be preselected based on the cards that correspond to that theme. Similarly, indicia may be able to be placed on the card that correspond to a certain mode. With this type of identification, before you start the game those preselected cards are used in the game and the other cards are not. And based on this indicia, the cards may further be organized in the game to correspond to the mode that the players select. For example, cards may be organized so that there are different piles of challenge cards for leader player than for a team player.

In some embodiments of a computer-based game system, the game system may further utilize artificial intelligence to provide individual feedback or to select challenges for particular players most appropriate to decisions where they may need improvement. For example, artificial intelligence may be used to vary a player's challenges and game themes based on the player's previous performance. In one embodiment, the game may start by having all players go through a base level of evaluation in a form of common problems and questions. After players and teams pass the basic evaluation round level, the game will adjust and move the players to next level to face scenarios depending on their actions and responses from the base level. This same adjustment may be repeated throughout the game until all levels have been successfully completed. The game may produce intermittent reports as feedback that can be used to help understand where and how players are doing (and in an educational setting to help understand players thinking process and guide them to better behavior).

One Embodiment of Methods to Play a Cognitive Skills Game:

In general, methods of playing the cognitive skills game comprise having players progress along a game progression according to a randomizer. Based on where the player is specifically in the game progression, they are presented with challenges to which they respond. And, based on their response and the corresponding reward, the player moves along the game progression until a game winning situation is met.

Figure 3:
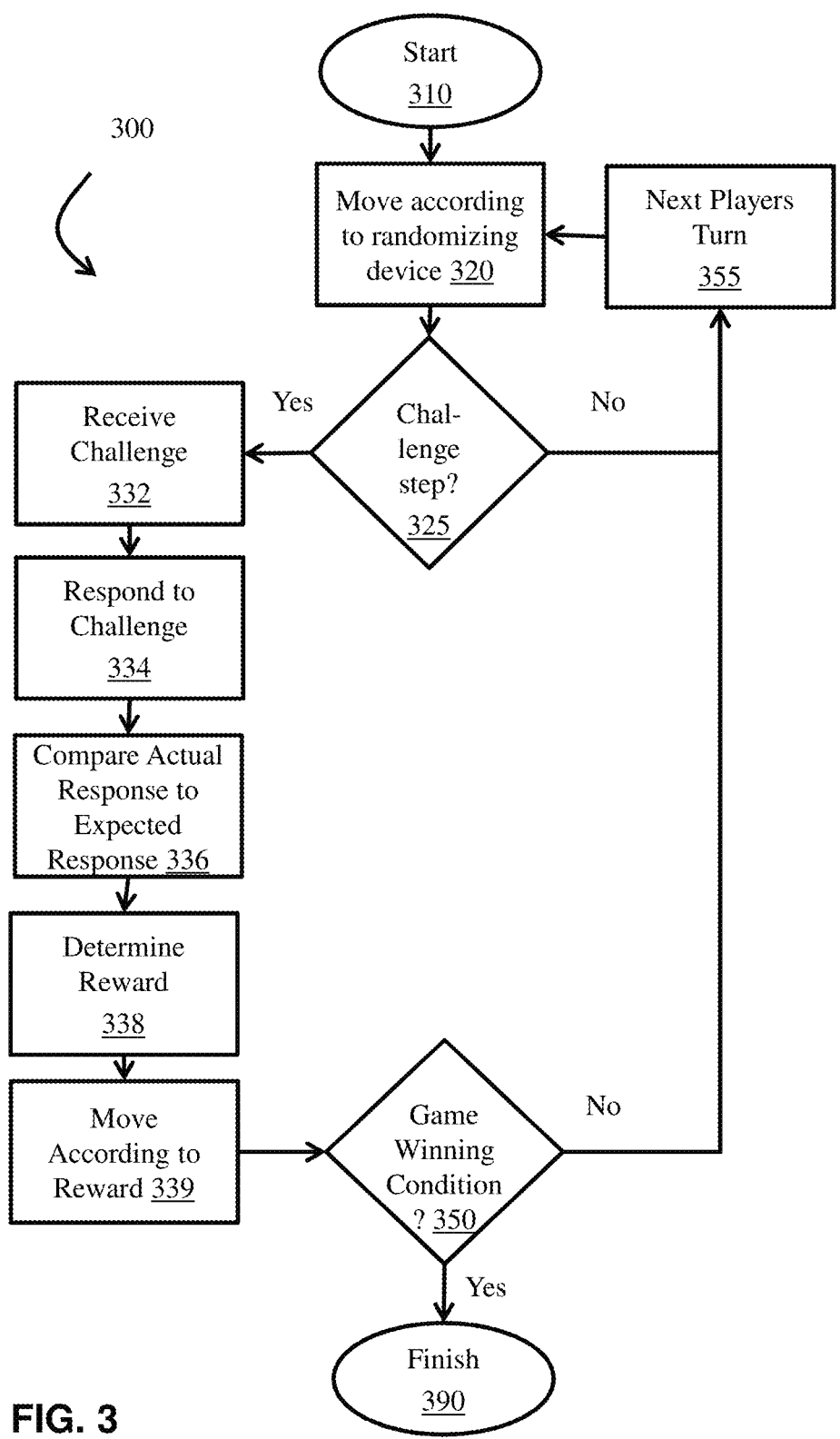
FIG. 3 shows a process diagram illustrating one example embodiment of methods to play the cognitive skills game.

FIG. 3 shows the methods of a more specific example embodiment of a cognitive skills game having a game board and each player is associated with a player identifier placed in a starting point of the game progression. After the game starts at 310, the first player utilizes the randomizing device and that player's identifier is then moved along the game progression according to directions from the randomizing device at 320. As the player identifier encounters different progression steps along the game progression, the progression step identifies whether a challenge will be presented to the player at 325. If a challenge is identified for that progression step, the player selects at 332 and responds to the challenge indicia at 334 and the player's actual response is compared to a set of predefined expected responses associated with predefined response rewards at 336. Based on the response reward determined at 338, the player identifier may move further along the game progression according to directions from the response reward at 339. If the game winning condition is not met at 350, these steps are reiterated at 355 and as each player identifier moves along the game progression, the state of the player identifier is compared to a predefined game winning condition to see if the game winning condition is met. The game is finished at 390 if a game winning condition is met at 350.

In an example embodiment consistent with FIGS. 1A and 1B, the cognitive skills game comprises a game board 120 that can be used even by or with young players. In this embodiment, players roll a dice as the randomizing device 150 and face situations where they will need to help other players, and by helping others and working together all players will get rewarded. These situations are presented to the players based on their position along the game progression 122. Challenges at this level may be general but they are geared to reinforce the fact that by helping others is the right thing to do and eventually become a habit regardless of the reward.

Referring to FIG. 1A, players will each pick a player identifier (character piece) 140A or 140B and place it in the start circle as the starting position. They will roll the dice 150 and whoever got the lowest number will start.

In some embodiments, the game will provide for role playing. In these embodiments the player may be assigned to various roles by selecting the player indicator reflecting that role or the role may be assigned the role indicia selected by them, such as by pulling role cards with role names in them. The role indicia may dictate the type of player indicator used by that player in the game, it can be part of the board came where they pick a token representing their role, it can be part of the card game where they will get roleplay cards.

Players will then take turns in rolling the dice 150 as the randomizing device and advancing along each progression step indicia 124A-124N of the game progression 122 according to the number shown on the roll from the dice 150. Special step indicia, such as buttons or the shapes of the progression steps as shown, along the game progression depict an opportunity for the player to address a challenge defining a situation where the players can make a difference in their surroundings by taking an action as a response to the challenge. The progression step indicia 124A-124N on the board will vary depending of which scenario (sports, townhall etc.) is being played. Here the progression step indicia 124A-124N will be marked by separate shapes or colors (e.g., orange, red, purple or blue). The player will read the instruction/challenge indicia (see FIG. 1B challenge sheet 160) stating what steps he will need to do to clear the problem and be able to continue play. If the instruction/challenge indicia calls for an action, all players must agree to player completing the action sufficiently before he can proceed according to the reward on the instruction card.

The cognitive skills game proceeds until the winning situation is met which here is when all players arrive in the finish circle. An order of winning may be defined as the order in which the players enter the finish circle.

In another embodiment of these methods, consistent with the game embodiment of FIGS. 1A and 1B, the challenges are presented through a set of predefined challenges having either question or action items in each card. With the actual response matched to the proper response as detailed on the challenge card and that proper response matched to the reward (not shown), the players may advance and may help others to advance. With the wrong set of answers or actions, players may end up in setting players backwards. Again, the board and challenge card may be customized to different game scenarios or themes. As described below, the game board and challenge cards may also be customized to allow for different game modes, different player modes and different player roles.

The cognitive skills game system of FIGS. 1A and 1C uses a game board similar to the game of FIGS. 1A and 1B with a slight difference. The difference being that when a player lands into a progression step indicia 124A-124N identifying that a challenge should be presented, the player takes one of the cards 160A-160D that matches the specific challenge (e.g., bully, kindness, help or friend) and should provide a response to that challenge. If the challenge indicia 161A-161D comprises a multiple-choice card question, the reward is determined generally by comparing the actual response to the closest expected response 162A-162D choices printed on the card (e.g., one of the expected responses) and mapping that choice to the reward indicia defined by the game. The reward may be printed on the card that corresponds to that choice or it may be defined elsewhere such as in the rule book. If the response to the challenge is an action or open response, the reward is determined by the reward indicia which may be printed on the card which may require some input or help from other game players. If the reward is a "good" reward reflecting a "good" decision, a positive reward is implemented and the players get to continue in the game from their current game progression position. If the response was a "bad" response reflecting a "bad" decision, a negative reward may be implemented such as making the player move their player identifier backwards a number of steps. If the player pulls a challenge card reciting a need to respond with an action or open response (such as tell other players why they are nice, what sports they are good etc.), that reward will also be determined by the reward indicia that may be printed on the card. For example, the challenge may require the challenged player to complete the required action and have other players determine if the action met the criteria for the reward. If all the other players agree that it met the criteria, all players will get rewarded as specified in the card. If it did not meet the criteria, the challenged player must try again next round. After trying 2 times, the challenged player can continue but may face a penalty as specified in the card. There may be cards where the challenged player must enlist help from other players in order to move along. These cards may include situations that have multiple levels of answers to the question, right, wrong, insensitive and uncaring. Various feedback and rewards may take place depending which type of response the player gives.

In general, in a team game mode, challenges, responses and rewards are presented to promote teamwork and team skill in the players. These teamwork skills may be to support each other and to collaborate in responding to challenges in order for the players to be successful and proceed along the game progression. For example, if one or more players in the team do not collaborate in doing the right thing, team ends up in a "jam" situation, where all players in the team are jammed (kept at their current game progression) until they can agree to right set of things. This can be done through responses and rewards that promote negotiation and empathy. Challenges, responses and rewards can be configured such that they put the responsibility on team members to convince and change the behavior of players who did not do the right thing.

In general, in a leadership game mode, challenges, responses and rewards are presented to promote leadership skills in the players or the player that selects that player more. For example, leadership skills may be to support the rest of the players on the team as a coach, teacher, CEO etc. and to make sure all team members are equally included and rewarded, without favoring, making side deals or bribing, to achieve success.

The game may be implemented in different versions geared towards different themes or scenarios that reflect various interest's players may have. There may be a SPORTS scenario, STEM scenario, TownHall scenario, BACKYARD scenario, SCHOOL scenario, STARTUP scenario, and others. In a STEM game, players will face challenges ranging from building structures (such as buildings, bridges, houses, roads, tunnels etc. and where players will need to design it, get permits, hire construction crew, oversee it, find funding), to building products and devices (such as cars, food). In a STARTUP setting they are members of for example of a biomedical or a car company, where they will need to navigate through collaborations, innovations, legal and moral questions, patents ownerships, marketing settings, hiring people and caring about them. It could be a hospital where players need to diagnose a patient or find a cure to a disease. In a Townhall version would have players work in Recreation departments, town offices, or a State house in coming up with new set of rules and laws and implementing them. In each case same principle will apply.

As one example of a specific mode and theme, a player may choose a single player team mode sports scenario. There the player will be part of the team and together with a team will face several challenges in making the sports team work and become successful. Challenges such as those presented by player clicks, star players looking to their own best interest or players with injuries will need to be responded to and players will need to find a way to support each and every player in the team and navigate social and athletic problems throughout a season. If a team finds a way to function together it may advance to regional, national and international levels with new players and situations. Similarly, if a player chooses a sports scenario and leadership mode, the player may become a team captain, manager or a coach of the team and will for example need to bring the team spirit up while facing very non-functioning player behaviors and pressure from fans and owners. In other game themes, players may for example be assigned to become either a group leading engineer or part of an engineering team with a task to design, fund, and build a building or bridge. Completing the task successfully would result in other projects and different teams. Similarly, in backyard themes, players could become one of the neighborhood kids or in a leadership mode be the older sibling or a parent, who is trying to fix situations in the neighborhood with some kids being excluded, having health problems, or dealing with a neighborhood bully or a gang that is trying to make kids do the wrong thing. Backyard could have tasks where players simply have to notice other people even if nothing is visible wrong, there may be an elderly person who has hard time mowing the lawn or plain and simple just would love to have a visitor every now and then. Finding solutions to these challenges will promote the team to work in a larger neighborhoods and town settings.

Figure 4:
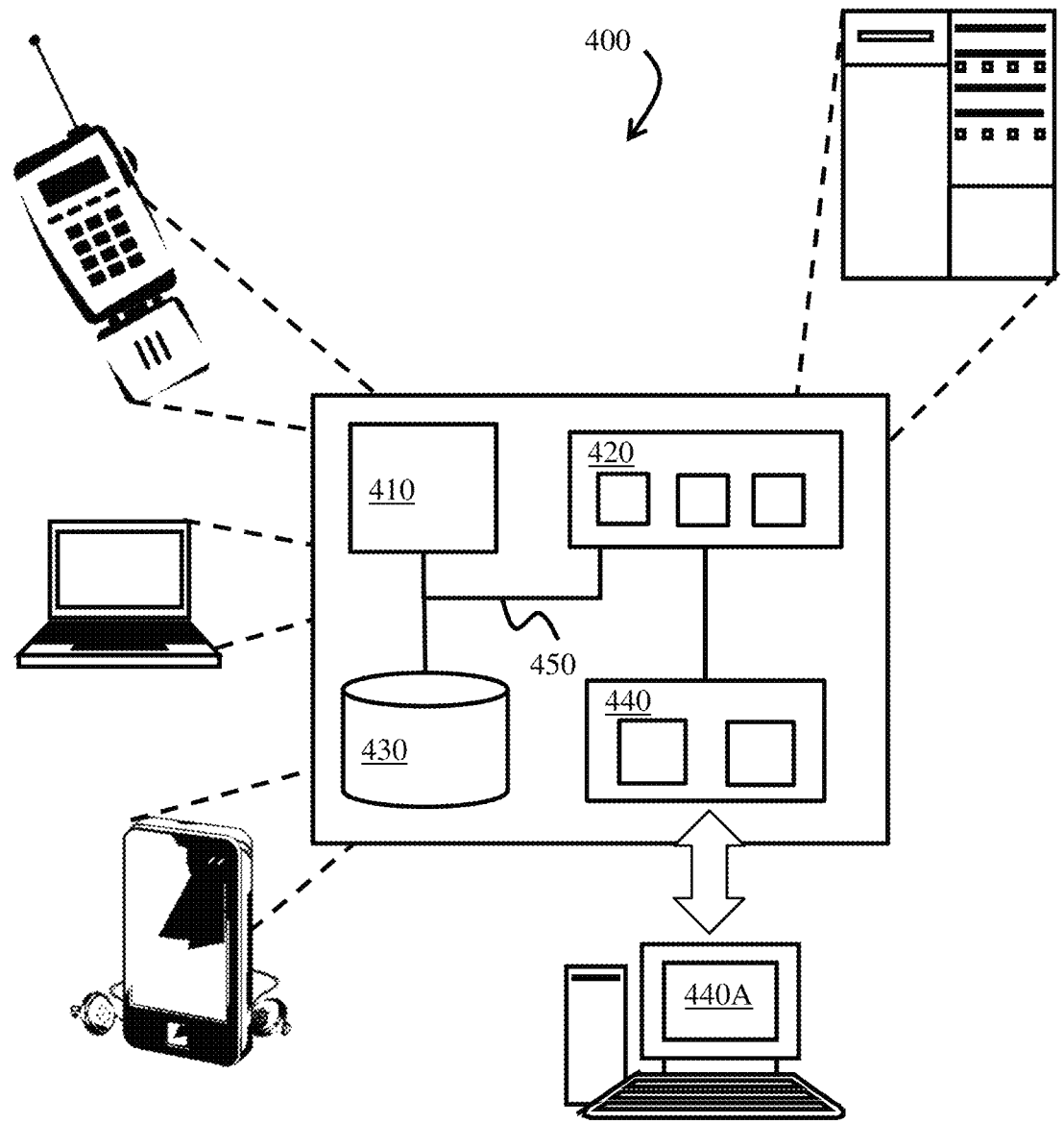
FIG. 4 illustrates one example embodiment of a computer system suitable for a cognitive skills game system.

In another embodiment of the methods to play a cognitive skills game, consistent with the game embodiment of FIG. 4, the game is a computer-based interactive game where a players may use a user interface to choose game options such as themes, game modes, player modes or roles. The player may select from several themes or types of scenarios of play as well as pick either a single player mode or a multiplayer mode. This cognitive skills game system may also allow players to choose if they would like to have a particular role such as being part of a team or if they would like to select to play in more of a leadership role. In a single player mode, such as in an online version of the game, the player may be arbitrarily assigned a role or theme.

Once players choose the desired game theme they will face several increasingly difficult levels and deeper moral and social conflicts made more complex by the challenges that require the player to balance the need to do the right thing without compromising integrity and support while also needing to succeed in the areas of game. For example, in sports manager scenario, players can make a profile for themselves (e.g., sex, age, looks, character, sport team they manage, background, challenges they face—these can be from players own life such as speaking up or leading a team, etc.). Once the player had made their character, they can set up other element of the game environment. In sports manager mode it would for example be a high level sports team needing to make it to playoffs with a team that is not functioning; players are arguing, not giving their full 100%. Maybe there is a dominant player, a biased coach who does not want to hear anyone else's opinions, They may need to get more funding and people to their games. The game environment may define a game situation where the sports team infrastructure is old and there could be few injuries and pending law suits. The player as manager is tasked to make all work within certain amount of time (there is a timer for each specific area to complete successfully). If not completed in time, the player will go backwards and needs also to answer specific questions and complete more training with detailed tasks related to areas where there were not successful. Once the player perfects a level they will move on to next level and so forth. At some points in the game progression, players may get connected to a hypothetical social media situations where they will need to analyze and respond. Final completion may be defined as when the preset task is done successfully.

In some embodiments of the computer-based game, players may have multiple tasks to navigate and depending on their collaboration and communal efforts with help of others, they can all together proceed to higher levels and tasks. One main objective of these embodiments of the game is that there will not be a single star player or a leader but that team members are all contributors in making the team successful and that team members will learn to supporting each other even if it means putting oneself out in short term.

In some embodiments, teams can be formed by one or multiple player playing against the computer or other "teams" online. Objective of each team type will be to overcome differences and achieve preset goals by working as a team and supporting each other in a constructive manner. Each team member will need to find solutions using help from others and by helping others sometimes seemingly without reward at first, they will eventually show enough team spirit and helpfulness to move ahead.

Figure 6:
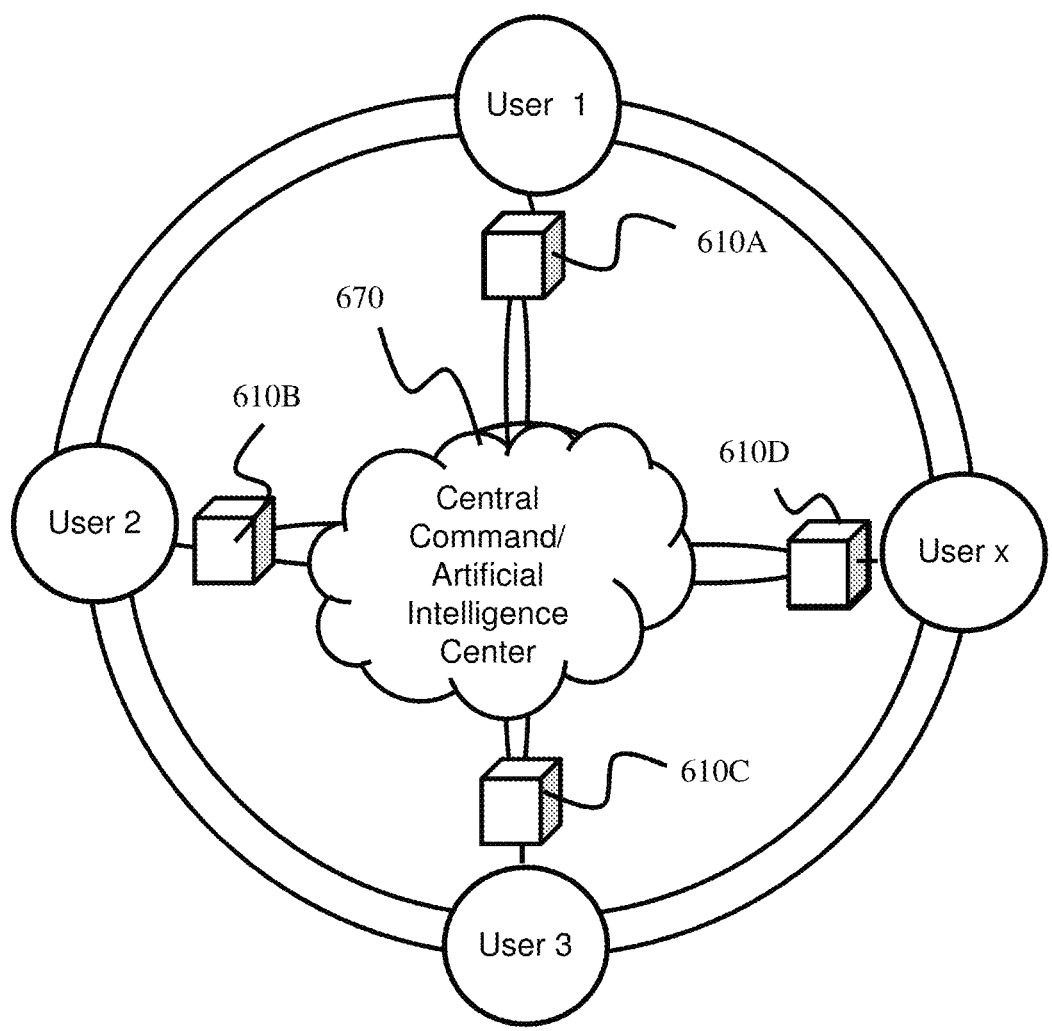
FIG. 6 illustrates a system architecture diagram of one embodiment of a computer based cognitive skills game system.

As shown in one example embodiment of a computer-based game show in FIG. 6, the clients or the individual players may connect to the central command center through a user interface 610A-610D such as a generic user interface, a specially programmed user interface, a proprietary user interface hardware or an installable software device. The central command center 670 may control the game scenarios, levels, timers and user connections. Social media connection as well as Artificial Intelligent based analyses and feedback may be installed in the user interface and/or the central command center 670.

One Example Embodiment of a Computer-Based Cognitive Skills Game System:

One embodiment of the cognitive skills game system generally comprises the components of FIGS. 1C, 2 and 3 in a software program product to be executed by a computer implemented system.

As will be readily apparent to those skilled in the art, cognitive skills game systems and methods can be embodied in hardware, software, or a combination of hardware and software. For example, a computer system or server system, or other computer implemented apparatus combining hardware and software adapted for carrying out the methods described herein, may be suitable. One embodiment of a combination of hardware and software could be a general purpose computer system with a computer program that, when loaded and executed, carries out the respective methods described herein. In some embodiments, a specific use computer, containing specialized hardware for carrying out one or more of the instructions of the computer program, may be utilized. In some embodiments, the computer system may comprise a device such as, but not limited to a digital phone, cellular phone, laptop computer, desktop computer, digital assistant, server or server/client system.

Computer program, software program, program, software or program code in the present context mean any expression, in any language, code or notation, of a set of instructions readable by a processor or computer system, intended to cause a system having an information processing capability to perform a particular function or bring about a certain result either directly or after either or both of the following: (a) conversion to another language, code or notation; and (b) reproduction in a different material form. A computer program can be written in any form of programming language, including compiled or interpreted languages, and it can be deployed in any form, including as a stand-alone program or as a module, component, subroutine, or other unit suitable for use in a computing environment.

FIG. 4 is a schematic diagram of one embodiment of a computer system 400 by which the methods to play a cognitive skills game may be carried out. The computer system 400 can be used for the operations described in association with any of the computer implemented methods described herein. The computer system 400 includes at least one processor 410, a memory 420 and an input/output device 440. Each of the components 410, 420, and 440 are operably coupled or interconnected using a system bus 450. The computer system 400 may further comprise a storage device 430 operably coupled or interconnected with the system bus 450.

The processor 410 is capable of receiving the instructions and/or data and processing the instructions of a computer program for execution within the computer system 400. In some embodiments, the processor 410 is a single-threaded processor. In some embodiments, the processor 410 is a multi-threaded processor. The processor 410 is capable of processing instructions of a computer stored in the memory 420 or on the storage device 430 to communicate information to the input/output device 440. Suitable processors for the execution of the computer program instruction include, by way of example, both general and special purpose microprocessors, and a sole processor or one of multiple processors of any kind of computer.

The memory 420 stores information within the computer system 400. Memory 420 may comprise a magnetic disk such as an internal hard disk or removable disk; a magneto-optical disk; an optical disk; or a semiconductor memory device such as PROM, EPROM, EEPROM or a flash memory device. In some embodiments, the memory 420 comprises a transitory or non-transitory computer readable medium. In some embodiments, the memory 420 is a volatile memory unit. In other embodiments, the memory 420 is a non-volatile memory unit.

The processor 410 and the memory 420 can be supplemented by, or incorporated in, ASICs (application-specific integrated circuits).

The storage device 430 may be capable of providing mass storage for the computer system 400. In various embodiments, the storage device 430 may be, for example only and not for limitation, a computer readable medium such as a floppy disk, a hard disk, an optical disk, a tape device, CD-ROM and DVD-ROM disks, alone or with a device to read the computer readable medium, or any other means known to the skilled artisan for providing the computer program to the computer system for execution thereby. In some embodiments, the storage device 430 comprises a transitory or non-transitory computer readable medium.

In some embodiments, the memory 420 and/or the storage device 430 may be located on a remote system such as a server system, coupled to the processor 410 via a network interface, such as an Ethernet interface.

The input/output device 440 provides input/output operations for the computer system 400 and may be in communication with a user interface 440A as shown. In one embodiment, the input/output device 440 includes a keyboard and/or pointing device. In some embodiments, the input/output device 440 includes a display unit for displaying graphical user interfaces or the input/output device 440 may comprise a touchscreen. In some embodiments, the user interface 440A comprises devices such as, but not limited to a keyboard, pointing device, display device or a touchscreen that provides a user with the ability to communicate with the input/output device 440.

The computer system 400 can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, wireless phone networks and the computers and networks forming the Internet.

Figure 5:
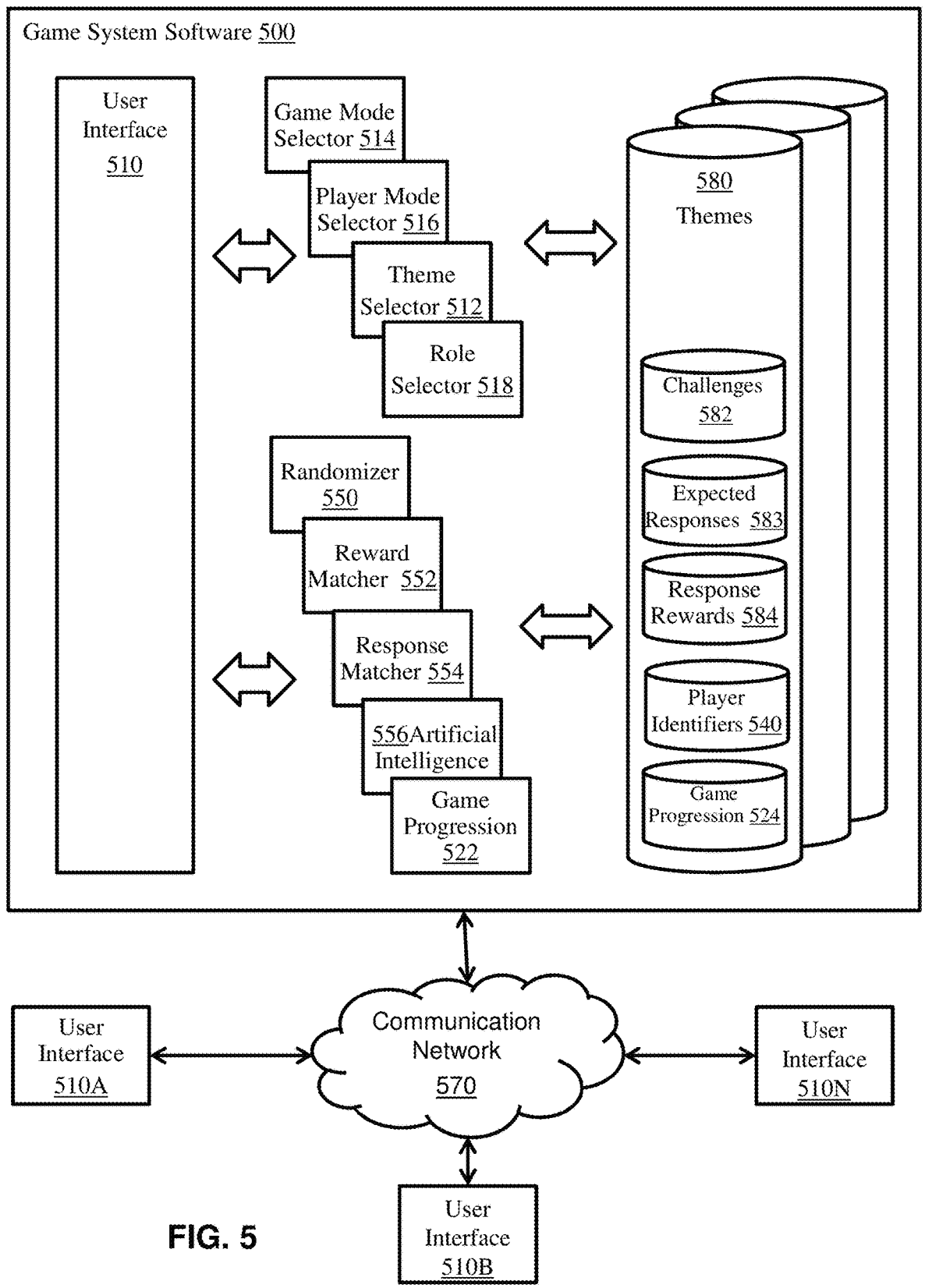
FIG. 5 illustrates a functional diagram of one embodiment of a program product of a cognitive skills game system.

A functional diagram of components of one embodiment of the computer program capable of executing the described methods is shown in the functional diagram in FIG. 5. As shown in FIG. 5, components of the computer program 500 (game system software) may comprise a user interface 510, a game mode selector module 514, a player mode selector module 516, a theme selector module 512, a role selector module 518, a randomizer module 550, a reward matcher module 552, a response matcher module 554, one or more artificial intelligence modules 556, a game progression module 522, and one or more databases 580 storing game data 581. The databases may store information and data to be used in the game system such as challenge data 582, expected response data 583, response reward data 584, player identifier data 540 and game progression data 524. As illustrated, the databases 580 and game data 581 stored may be organized to reflect different themes of the game system. As also shown, the game system software may be accessed by one or more user interfaces 510A-510N accessing the game system software remotely over a communications network such as the Internet 570.

In some embodiments of a computer based cognitive skill game system implemented consistent with the system architecture of FIG. 5, the software modules perform the functions of the of the game as described above (see at least FIG. 3). For example the user interface 510 allows the user to interface the game components; the game mode selector module 514 allows the player to select the game mode; the player mode selector module 516 allows the player to select whether one or more players are playing; the theme selector module 512 allows the player to select the theme of the game; the role selector module 518 allows a player to select their role; the randomizer module 550 provides a random indicator to guide a player's progression; the reward matcher module 552 matches the actual response to the expected response and reward; the response matcher module 554 matches the actual response to the expected response; the one or more artificial intelligence modules 556 are able to analyze and modify game components and date, such as responses and rewards, based on actual game date; and the game progression module 522 communicates the progression of players in the game. In these embodiments, the data stored may be used by the software modules to execute their functions. For example, the challenge data 582 is used to as the challenge presented to the player through the user interface; the expected response data 583 is used by the reward matcher module 554 and the response matcher module 554 to match with the actual player response; the response reward data 584 is used by the reward matcher module 554 to determine the response reward for the player; the player identifier data 540 is used by modules such as the player mode selector module 516 and the role selector module 518 to identify characteristics the player; and game progression data 524 is use to communicate the progression steps of player along the game progression.

FIG. 6 illustrates a system architecture diagram of one embodiment of a computer based cognitive skills game system. As shown, different users may be able to access components of the game system software, here shown as central command/artificial intelligence center 670, by communicating over a communications network such as the Internet with a user interface 610A-610C.

One example embodiment of the cognitive skills game systems and methods may be embodied in a computer program product, the computer program product comprising a computer readable medium having a computer readable program code tangibly embodied therewith, the computer program code configured to implement the methods described herein, and which, when loaded in a computer system comprising a processor, is able to carry out these methods.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

We claim:

1. A cognitive skills game system to teach cognitive skills, the system comprising:
   a randomizing device;
   a game board comprising a game progression;
   a plurality of player identifiers;
   a plurality of challenge indicia defining a plurality of predefined challenges; and
   a set of rules defining a game winning condition;
   one or more predefined expected responses associated with each of the plurality of predefined challenges;
   a predefined response reward associated with each of the one or more predefined expected responses;
   an actual response of a player to each of the plurality of predefined challenges;
   the actual response of the player to be matched with one of the one or more predefined expected responses;
   the predefined response reward associated with a player progression along the game progression;
   whereby the actual response of the player identifies the predefined response reward and determines the player progression along the game progression;
   a vote box configured to identify the actual response of the player;
   the vote box comprising a first vote light and a second vote light; and
   a vote card pair comprising a first vote card from the player and a second vote card from another player whereby one of the vote card pair is configured to pass a light from the first vote light or the second vote light to indicate a vote and whereby the vote is the actual response of the player to at least one of the plurality of predefined challenges.

2. The cognitive skill game system of claim 1 wherein:
   the plurality of challenge indicia comprise the plurality of predefined challenges presented on a plurality of challenge cards; and
   the plurality of predefined challenges comprising at least one conflict challenge and at least one caring challenge.

3. The cognitive skill game system of claim 2 wherein the at least one conflict challenge comprises a bully challenge.

4. The cognitive skill game system of claim 2 wherein the at least one caring challenge comprises a kindness challenge.

5. The cognitive skill game system of claim 2 wherein the at least one caring challenge comprises a help challenge.

6. The cognitive skill game system of claim 2 wherein the at least one caring challenge comprises a friend challenge.

7. The cognitive skill game system of claim 1 further comprising a computer based game system wherein at least one of the game board, the plurality of player identifiers and the plurality of challenge indicia are presented to the player by a user interface of the computer based game system.

8. A cognitive skills game system to teach cognitive skills, the system comprising:
   a game board comprising a game progression;
   a plurality of player identifiers;
   a plurality of challenge indicia defining a plurality of predefined challenges;
   the plurality of challenge indicia comprise the plurality of predefined challenges presented on a plurality of challenge cards;
   the plurality of predefined challenges comprising at least one conflict challenge and at least one caring challenge;
   a predefined response reward associated with an actual response of a player to each of the plurality of predefined challenges;
   a randomizing device;
   a player progression along the game progression represented by a progression of their one of the plurality of player identifiers as determined by one of the predefined response reward or the player or the randomizing device;
a set of rules defining a game winning condition; and
the cognitive skills game system further comprising:
- a vote box configured comprising a first vote light and a second vote light configured to identify the actual response of the player, and
- a vote card pair comprising a first vote card from the player and a second vote card from another player:
  - whereby one of the vote card pair is configured to pass a light from the first vote light or the second vote light to indicate a vote, and
  - whereby the vote is the actual response of the player to at least one of the plurality of predefined challenges.

9. The cognitive skill game system of claim 8 wherein the plurality of predefined challenges comprise at least one conflict challenge and at least one caring challenge.

10. The cognitive skill game system of claim 9 wherein:
the at least one conflict challenge comprises a bully challenge; and
the at least one caring challenge comprises at least one selected from the group consisting of:
  a kindness challenge,
  a help challenge, and
  a friend challenge.

11. The cognitive skill game system of claim 8 further comprising a computer based game system wherein at least one of the game board, the plurality of player identifiers and the plurality of challenge indicia are presented to the player by a user interface of the computer based game system.

12. A voting apparatus to determine a vote in a game system, the voting apparatus comprising:

a vote box;
a first vote light and a second vote light;
a vote card pair comprising a vote card and an additional vote card;
the vote card configured to pass a light from the first vote light or the second vote light to indicate a vote;
the additional vote card configured to pass the light from the first vote light or the second vote light to indicate an additional vote; and
the vote card pair configured to pass the light from the first vote light or the second vote light if the vote and the additional vote are identical.

13. The voting apparatus of claim 12 further comprising:
a third vote card configured to pass the light from the first vote light or the second vote light to indicate a third vote; and
the vote card pair and the third vote card configured to pass the light from the first vote light or the second vote light if the vote, the additional vote and the third vote are identical.

14. The voting apparatus of claim 12 wherein the vote represents a response to a predefined challenge.

15. The voting apparatus of claim 14 wherein the predefined challenge comprises at least one conflict challenge and at least one caring challenge.

16. The voting apparatus of claim 15 wherein the at least one conflict challenge comprises a bully challenge.

17. The voting apparatus of claim 15 wherein the at least one caring challenge comprises a kindness challenge.

18. The voting apparatus of claim 15 wherein the at least one caring challenge comprises a help challenge.

19. The voting apparatus of claim 15 wherein the at least one caring challenge comprises a friend challenge.

* * * * *